(12) United States Patent  
Mikami (10) Patent No.: US 12,138,901 B2
(45) Date of Patent: Nov. 12, 2024

(54) MOLDED CEILING MATERIAL FOR VEHICLE AND PRODUCTION METHOD THEREFOR

(71) Applicant: Sanwa Kogyo Co., Ltd., Hiroshima (JP)

(72) Inventor: Masahiko Mikami, Hiroshima (JP)

(73) Assignee: Sanwa Kogyo Co., Ltd., Hiroshima (JP)

( * ) Notice: Subject to any disclaimer, the term of this patent is extended or adjusted under 35 U.S.C. 154(b) by 242 days.

(21) Appl. No.: 17/398,608

(22) Filed: Aug. 10, 2021

(65) Prior Publication Data

US 2022/0016868 A1 Jan. 20, 2022

Related U.S. Application Data

(63) Continuation of application No. PCT/JP2020/003189, filed on Jan. 29, 2020.

(30) Foreign Application Priority Data

Feb. 18, 2019 (JP) .................................. 2019-026856

(51) Int. Cl.
*B32B 5/24* (2006.01)
*B32B 5/02* (2006.01)
(Continued)

(52) U.S. Cl.
CPC .............. *B32B 5/245* (2013.01); *B32B 5/022* (2013.01); *B32B 5/18* (2013.01); *B32B 5/266* (2021.05);
(Continued)

(58) Field of Classification Search
CPC B32B 5/245; B32B 5/022; B32B 5/18; B32B 5/266; B32B 7/02; B32B 7/12;
(Continued)

(56) References Cited

U.S. PATENT DOCUMENTS

2011/0151241 A1* 6/2011 Mikami .................. B32B 27/10
428/317.7
2014/0299252 A1* 10/2014 Abe .......................... B32B 7/12
264/122

FOREIGN PATENT DOCUMENTS

CN 102105332 A 6/2011
CN 102514307 A 6/2012
(Continued)

OTHER PUBLICATIONS

Espacenet translation of JP-2008174073-A (Year: 2023).*
(Continued)

*Primary Examiner* — Michael Zhang
(74) *Attorney, Agent, or Firm* — Procopio, Cory, Hargreaves & Savitch LLP (57) ABSTRACT

A ceiling material body (1*a*) includes a substrate layer (2) formed from rigid urethane foam; a first fiber-reinforced layer (3) provided on an in-cabin side of the substrate layer (2); a second fiber-reinforced layer (4) provided on an out-cabin side of the substrate layer (2); a surface layer (5) provided on an in-cabin side of the first fiber-reinforced layer (3); and a back layer (6) provided on an out-cabin side of the second fiber-reinforced layer (4). The second fiber-reinforced layer (4) includes a glass paper (7) overlaying the substrate layer (2) and a glass mat (8) overlaying an opposite side of the glass paper (7) from the substrate layer (2).

9 Claims, 7 Drawing Sheets (51) Int. Cl.
| | |
|---|---|
| *B32B 5/18* | (2006.01) |
| *B32B 5/26* | (2006.01) |
| *B32B 7/02* | (2019.01) |
| *B32B 7/12* | (2006.01) |
| *B32B 37/12* | (2006.01) |
| *B32B 37/24* | (2006.01) |
| *B60R 13/02* | (2006.01) |
| *D21H 13/24* | (2006.01) |
| *D21H 13/40* | (2006.01) |
| *D21H 27/36* | (2006.01) |

(52) U.S. Cl.
CPC ............ *B32B 7/02* (2013.01); *B32B 7/12* (2013.01); *B32B 37/12* (2013.01); *B32B 37/24* (2013.01); *B60R 13/0212* (2013.01); *D21H 13/24* (2013.01); *D21H 13/40* (2013.01); *D21H 27/36* (2013.01); *B32B 2250/05* (2013.01); *B32B 2260/023* (2013.01); *B32B 2260/028* (2013.01); *B32B 2260/046* (2013.01); *B32B 2262/0276* (2013.01); *B32B 2262/101* (2013.01); *B32B 2262/108* (2013.01); *B32B 2262/144* (2021.05); *B32B 2266/0278* (2013.01); *B32B 2305/022* (2013.01); *B32B 2305/07* (2013.01); *B32B 2305/28* (2013.01); *B32B 2305/72* (2013.01); *B32B 2307/546* (2013.01); *B32B 2307/718* (2013.01); *B32B 2310/0418* (2013.01); *B32B 2315/085* (2013.01); *B32B 2315/14* (2013.01); *B32B 2367/00* (2013.01); *B32B 2375/00* (2013.01); *B32B 2605/08* (2013.01)

(58) Field of Classification Search
CPC ..... B32B 37/12; B32B 37/24; B32B 2250/05; B32B 2260/023; B32B 2260/028; B32B 2260/046; B32B 2262/0276; B32B 2262/101; B32B 2262/108; B32B 2262/144; B32B 2262/0278; B32B 2305/022; B32B 2305/07; B32B 2305/28; B32B 2305/72; B32B 2307/546; B32B 2307/718; B32B 2310/0418; B32B 2315/085; B32B 2315/14; B32B 2367/00; B32B 2375/00; B32B 2605/08; B60R 13/0212; D21H 13/24; D21H 13/40; D21H 27/36

See application file for complete search history.

(56) References Cited

FOREIGN PATENT DOCUMENTS

| | | | |
|---|---|---|---|
| JP | H0939142 A | * | 2/1997 |
| JP | 2008174073 A | * | 7/2008 |
| JP | 2009120025 A | | 6/2009 |
| JP | 2010208607 A | | 9/2010 |
| JP | 2012-086661 A | | 5/2012 |
| JP | 2012-162138 A | | 8/2012 |
| WO | 2010/029861 A1 | | 3/2010 |

OTHER PUBLICATIONS ip.com Translation of JP-H0939142-A (Year: 2024).*
Notice of First Examination Opinion dated Dec. 30, 2022 for CN Application No. 202080014941.4, mailed on Dec. 30, 2022, in 7 pages.
International Search Report for Corresponding PCT Application No. PCT/JP2020/003189 dated Apr. 14, 2020, 2 pages.

* cited by examiner

| | 2nd fiber reinforced layer(g/m²) | | back side of substrate layer | adhesive application side | Weight of general surface portion(g/m²) | Maximum bending load (length/width)(N) | Bending elasticity slope(length/width)(N/cm) | Back side peel strength (N/25mm) | |
|---|---|---|---|---|---|---|---|---|---|
| | Glass paper | Glass mat | | | | | | Substrate layer/Glass fiber reinforced layer (length / width) | Glass fiber reinforced layer/Back layer (length / width) |
| manufacturer's standard value | | | | | — | 13.0 | 29.4 | — | — |
| Test material A | | | | | 740.5 | 21.9/20.2 | 73.1/76.8 | 1.9/1.9 | 3.4/2.7 |
| Test material B | | | | | 875.5 | 20.5/19.2 | 102.6/95.7 | 2.5/2.1 | 6.8/6.2 |
| Test material C | 30 | 70 | Glass paper | Glass paper | 745.5 | 34.4/31.2 | 128.7/122.4 | 3.7/2.8 | 4.6/4.3 |
| | | | | Glass mat | | 23.7/22.4 | 101.9/93.5 | 0.6/0.4 | 2.4/2.0 |
| | | | Glass mat | Glass paper | | 26.9/25.9 | 107.6/104.9 | 2.4/2.3 | 4.8/4.5 |
| | | | | Glass mat | | 28.2/25.2 | 110.1/99.1 | 2.8/2.9 | 5.0/4.0 |
| Test material D | 30 | 60 | Glass paper | Glass paper | 735.5 | 31.8/29.7 | 105.6/101.3 | 3.2/2.4 | 4.2/4.0 |
| Test material E | 40 | 70 | Glass paper | Glass paper | 755.5 | 34.8/31.5 | 130.1/124.7 | 3.2/2.5 | 4.4/4.2 |
| Test material F | 40 | 80 | Glass paper | Glass paper | 765.5 | 35.1/32.0 | 134.2/127.3 | 3.5/2.9 | 4.5/4.3 |
| Test material G | 50 | 80 | Glass paper | Glass paper | 775.5 | 36.5/32.9 | 140.2/131.5 | 3.6/2.9 | 4.5/4.4 |

[FIG. 6]

|  | Weight of side surface portion (g/m$^2$) | Maximum bending load (length/width) (N) | Bending elasticity slope(length/width) N/cm) |
|---|---|---|---|
| Test material A' | 895.5 | 16.2/15.1 | 52.6/49.1 |
| Test material B | 875.5 | 16.8/16.2 | 52.1/51.0 |
| Test material C | 745.5 | 17.1/16.1 | 53.5/51.1 |

[FIG. 7]

|  | Weight of general surface portion (g/m$^2$) | Weight of side surface portion (g/m$^2$) | Total weight of ceiling(g) |
|---|---|---|---|
| Test material A | 740.5 | – | 2024 |
| Test material A' | 740.5 | 895.5 | 2258 |
| Test material B | 875.5 | – | 2566 |
| Test material C | 745.5 | – | 2068 |
| Test material E | 755.5 | – | 2091 |

MOLDED CEILING MATERIAL FOR VEHICLE AND PRODUCTION METHOD THEREFOR

CROSS-REFERENCE TO RELATED APPLICATIONS

This application is a continuation of International application No. PCT/JP2020/003189 filed on Jan. 29, 2020, which claims priority from Japanese patent application No. 2019-026856 filed on Feb. 18, 2019, each of which is incorporated herein by reference in its entirety and for all purposes.

TECHNICAL FIELD

The present disclosure relates to a vehicular formed ceiling material disposed on an in-cabin side of a roof panel of a vehicle.

BACKGROUND OF THE DISCLOSURE

Conventionally, a formed ceiling material for a vehicle is known in which a substrate layer is formed from, for example, rigid urethane foam, and fiber-reinforced layers are provided on opposite sides of the substrate layer, and a surface layer and a back layer are provided on outer sides of the respective fiber-reinforced layers. The fiber-reinforced layers not only provide strength and rigidity required for the formed ceiling material, but also aid in retaining a shape of the formed ceiling material after forming. A glass mat is often used as a material for the fiber-reinforced layers. The glass mat is obtained in the following manner: a number of chopped strands are produced by bundling about 80 glass filaments having a diameter of from about 10 to about 15 μm to form fiber bundles having a width of from 0.8 to 1.5 mm and then by cutting the fiber bundles to have a length of about 50 mm, and after that, the number of chopped strands are randomly dispersed to be accumulated in the shape of a mat, and combined into one piece using a binder. The fiber-reinforced layers formed from the glass mat may have portions of a reduced basis weight in places when the formed ceiling material is formed. The basis weight of the glass mat to be used thus needs to be determined taking such matter into account. The portions of a reduced basis weight exist in places because the glass filaments can neither stretch nor deform and thus, adjacent glass filaments (chopped strands) in the glass mat follow deformation to be displaced from each other as the formed ceiling material is formed. This results in the reduced basis weight of the glass mat, for example, in regions where the shape is significantly modified during the formation of the formed ceiling material. Thus, a glass mat having a nominal basis weight equal to or less than 100 g/m2 is generally considered unusable in the formed ceiling material.

In recent years, the automotive industry requires fulfillment of both improved strength and rigidity of components for modularizing vehicle components for the purpose of labor saving and enhanced efficiency, and a reduced weight of components for improving fuel economy and performance. The formed ceiling material also needs a structure ensuring a reduced weight and required strength and rigidity.

To address this, for example, it may be contemplated to increase the thickness of the fiber-reinforced layers to enhance strength and rigidity of the formed ceiling material.

In this respect, it is viewed that the formed ceiling material generally has a structure in which, for example, the substrate layer formed from rigid urethane foam has a thickness of 8 mm, each of the fiber reinforced layers formed from the glass mat has a basis weight of 100 g/m2, an adhesive applied to the fiber reinforced layers has a weight of 15 g/m2, the surface layer formed from non-woven fabric has a weight of 200 g/m2, and the back layer formed from a film and non-woven fabric has a weight of 70.5 g/m2. In this instance, a percentage of the weight of the fiber reinforced layers and the adhesive relative to the total weight of the formed ceiling material is about 31 weight %. Thus, the formed ceiling material is characterized by having a greater percentage of the weight of the fiber reinforced layers and the adhesive to the total weight thereof. While an increased thickness of the fiber reinforced layers allows improved strength and rigidity of the formed ceiling material, there is an issue that the increased thickness of the fiber reinforced layers may significantly contribute to an increased weight of the entire formed ceiling material.

For avoiding this issue, it is conceived to use glass paper which is thinner and more rigid than the glass mat and having reduced variations in basis weight, in the fiber reinforced layers of the formed ceiling material.

The glass paper is generally produced by a wet type paper manufacturing method using glass filaments. For example, a formed ceiling material for a vehicle as described in International patent publication No. WO2010/029861 is obtained by press-forming a laminated sheet, and includes: fiber-reinforced layers formed from glass paper and provided on opposite sides of a substrate layer formed from rigid urethane foam; and a surface layer and a back layer provided on outer sides of the respective fiber-reinforced layers. In WO2010/029861, the glass filaments used in the glass paper have a size as large as 25 mm which is longer than a common size of about 12 mm, so as to avoid the state where when displaced relative to each other during forming, adjacent glass filaments are fully spaced from each other to make a hole. An isocyanate based adhesive then has smaller bonding strength to the glass paper. Thus, when the isocyanate based adhesive is applied to glass paper produced using a silane based treatment agent that exhibits excellent affinity to the isocyanate based adhesive and the press-forming is performed, the isocyanate based adhesive strongly bonds among the substrate layer, the fiber reinforced layers, the surface layer, and the back layer.

Then, a formed ceiling material for a vehicle as described in Japanese laid-open patent publication No. 2012-162138 includes a substrate layer formed from rigid urethane foam; a first fiber-reinforced layer formed from a glass mat and provided on an in-cabin side of the substrate layer; a second fiber-reinforced layer formed form glass paper and provided on an out-cabin side of the substrate layer; a surface layer provided on an in-cabin side of the first fiber-reinforced layer; and a back layer provided on an out-cabin side of the second fiber-reinforced layer, wherein a density of the substrate layer adjacent to the second fiber-reinforced layer is determined to be lowered to easily deform so as to reduce, during forming, breaks of the second fiber-reinforced layer formed from the glass paper. A film layer is then interposed between the second fiber-reinforced layer and the back layer, so that the film layer makes up shape retention of the formed ceiling material having easily deformed due to the determined lower density of the substrate layer. Moreover, as in WO2010/029861, the glass paper produced using the silane based treatment agent that exhibits excellent affinity to the isocyanate based adhesive is used in the second fiber-reinforced layer and the isocyanate based adhesive strongly bonds between the layers.

SUMMARY

In recent years, the formed ceiling material can include regions having a shape greatly modified, for example, due to the diversity in design of vehicles. Given these circumstances, researchers investigated whether the structures as described in WO2010/029861 and JP2012-162138 could be applied even to the regions. In the regions having a shape greatly modified in the formed ceiling material, breaks and wrinkles might occur in the fiber-reinforced layer formed from the glass paper, thus being unable to obtain expected results.

For this reason, the researchers further studied to achieve both improved strength and rigidity of, and a reduced weight of the formed ceiling material. In the study, a relationship between deformation of the substrate layer and that of the fiber-reinforced layers was analyzed in detail and a bulge-forming test using test pieces was performed as one of the analyses. For the test, test pieces T1, T2, and T3 were prepared. In the test piece T1 having a configuration the same as a common formed ceiling material, a substrate layer was rigid urethane foam having a density of 0.030 g/m3 and fiber reinforced layers on opposite sides of the substrate layer were glass mats having a basis weight of 100 g/m2. In the test piece T2 having a configuration the same as the formed ceiling material as described in WO2010/029861, a substrate layer was rigid urethane foam having a density of 0.030 g/m3 and fiber reinforced layers on opposite sides of the substrate layer were glass paper having a basis weight of 50 g/m2. In the test piece T3 having a configuration the same as the formed ceiling material as described in JP2012-162138, a substrate layer was rigid urethane foam having a density of from 0.022 to 0.024 g/m3 and a fiber reinforced layer formed from a glass mat having a basis weight of 100 g/m2 was provided on an in-cabin side of the substrate layer and then a fiber reinforced layer formed from glass paper having a basis weight of 50 g/m2 was layered on an out-cabin side of the substrate layer. A grid or checker board pattern was applied to surfaces of the substrate layer and the fiber reinforced layers of the test pieces T1 to T3 to observe an amount of stretch in areas of the test pieces T1 to T3 before and after forming. The test pieces T1 to T3 were then deformed by pressing a generally conically shaped punch with a rounded distal end, into the test pieces T1 to T3 from a surface layer side, and a relationship between the areas of the test pieces T1 to T3 and the stretch of the substrate layer was studied by changes in the pattern applied on the surfaces of the substrate layer and the fiber reinforced layers.

Figure 10:
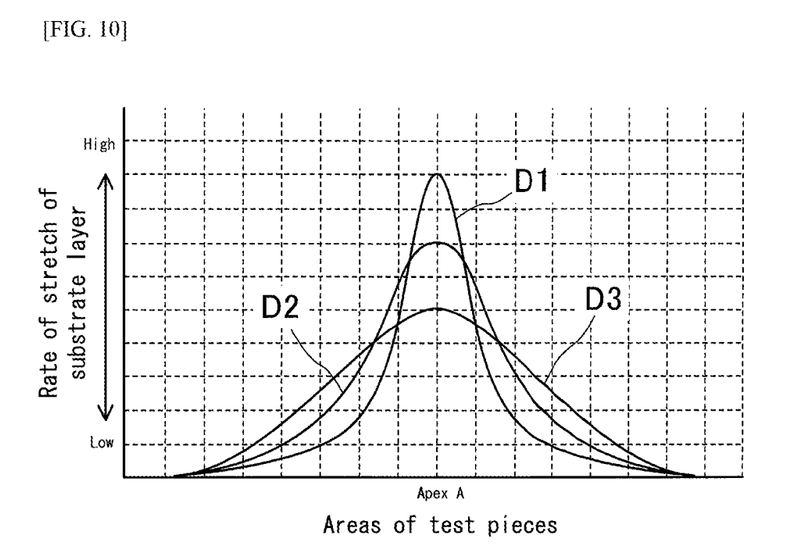
FIG. 10 is a graph showing results obtained by performing a bulge forming test on test pieces corresponding to conventional vehicular formed ceiling materials, and illustrating rate of stretches in areas of substrate layers before and after forming.
Figure 11:
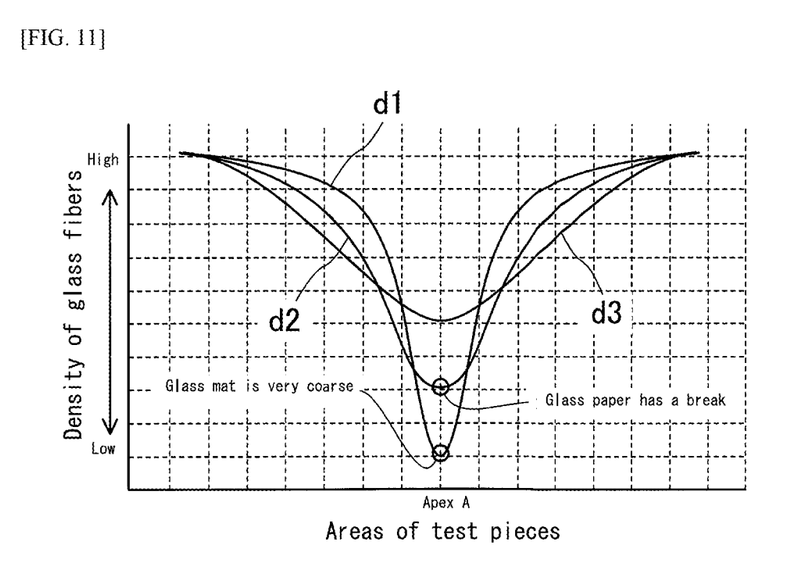
FIG. 11 is a graph showing results obtained by performing a bulge forming test on test pieces corresponding to conventional vehicular formed ceiling materials, and illustrating a state of fiber densities in areas of fiber reinforced layers after forming.

FIG. 10 is a graph having a horizontal axis representing the areas of the test pieces T1 to T3 and a vertical axis representing a ratio of the stretch of the substrate layer, plotted following observing changes before and after deformation in the pattern applied on the surfaces of the substrate layer and the fiber reinforced layers to calculate an amount of the stretch of the substrate layer, in a certain cross-section C passing through a portion of each of the test pieces T1 to T3 corresponding with an apex A of the punch after bulge-forming. Data D1 to D3 are obtained by bulge-forming the test pieces T1 to T3, respectively. FIG. 11 is then a graph having a horizontal axis representing the areas of the test pieces T1 to T3 and a vertical axis representing a fiber density, plotted following observing a state of the fiber reinforced layers to calculate the fiber density of the areas of the fiber reinforced layers, in the cross-section C. Data d1 to d3 are obtained by bulge-forming the test pieces T1 to T3, respectively.

As seen by data D1, in the substrate layer of the test piece T1, large deformation occurs only in a region corresponding with the apex A of the punch and substantially no deformation occurs and the initial shape is maintained in other regions. Then, as seen by data d1, in the fiber reinforced layers of the test piece T1, the fiber density decreases in a region corresponding with the apex A of the punch. This is because, in the case of the glass mat, adjacent glass filaments (chopped strands) are easily displaced relative to each other and thus, deformation occurs similarly to and along with the deformation of the areas of the substrate layer. As a result, the decreased fiber density in the region of the fiber reinforced layers of the test piece T1 corresponding with the apex A of the punch is caused by large displacement of the chopped strands relative to each other along with the large deformation areas of the substrate layer in the region of the fiber reinforced layers corresponding with the large deformation areas of the substrate layer.

As seen by data D2, in the substrate layer of the test piece T2, while large deformation occurs in a region corresponding with the apex A of the punch, the region is deformed less than the test piece T1 and instead, regions surrounding such region are deformed more than the corresponding regions of the test piece T1. Then, as seen by data d2, in the fiber reinforced layers of the test piece T2, while the fiber density does not decrease in a region corresponding with the apex A of the punch as much as the corresponding region of the test piece T1, regions surrounding such region have a fiber density lower than the corresponding regions of the test piece T1. This is because, in the case of the glass paper, adjacent glass filaments are less likely to displace than those of the glass mat and thus, greater resistance is applied to the substrate layer by the glass paper as the substrate layer stretches. Thereby, stretched regions of the substrate layer are not concentrated at the region corresponding with the apex A of the punch, but rather decentralized around such region. On the contrary, in the test piece T2, breaks occur in the region of the out-cabin side glass paper corresponding with the apex A of the punch and wrinkles occur in the region of the in-cabin side glass paper corresponding with the apex A of the punch. The formed ceiling material 1 having the configuration of the test piece T2 is thus difficult to make into a product.

Lastly, as seen by data D3, in the substrate layer of the test piece T3, a region corresponding with the apex A of the punch is deformed less than the corresponding region of the test piece T2 and instead, regions surrounding such region are deformed more than the corresponding regions of the test piece T2. Then, as seen by data d3, in the fiber reinforced layers of the test piece T3, while the fiber density does not decrease in a region corresponding with the apex A of the punch as much as the corresponding region of test piece T2, regions surrounding such region have a fiber density lower than the corresponding regions of the test piece T2. This is because the in-cabin side fiber reinforced layer is the glass mat and the substrate layer has a lowered density to deform easier than the test piece T2 and thereby, the substrate layer as such deforms flexibly along the punch even when greater resistance is applied to the substrate layer by the glass paper during forming. In the case of the test piece T3, breaks do not occur in the region of the fiber reinforced layers corresponding with the apex A of the punch and further, wrinkles do not occur in the in-cabin side glass mat. It is thus highly possible to make into a product with the configuration of the test piece T3. However, a film layer is necessary for the shape retention and issues of an increase in cost and weight then emerge.

As a result, it has found possible to fulfill both improved strength and rigidity of and a reduced weight of the formed ceiling material by applying a paper material, such as glass paper, to the formed ceiling material. On the other hand, the following issues need to be addressed: For the reason that the glass filaments constituting the glass paper are densely intertwined as compared with those of the glass mat, when the fiber reinforced layers on the opposite sides of the substrate layer are the glass paper as described in WO2010/029861, resistance between adjacent glass filaments in the glass paper is greater as the formed ceiling material is formed, and an amount of relative displacement of the glass filaments is insufficient, resulting in being unable to follow modification of the shape. Particularly, the out-cabin side fiber reinforced layer often breaks and the in-cabin side fiber reinforced layer is easily subjected to generation of winkles.

When the configuration as described in JP2012-162138 is applied, the out-cabin side fiber reinforced layer formed from the glass paper has reduced breaks and the in-cabin side fiber reinforced layer formed from the glass mat has reduced generation of winkles, during forming. However, the issue that a film layer added for retaining the shape of the formed ceiling material increases cost and weight needs to be addressed.

The present disclosure is made in view of the foregoing and an object of the present disclosure is to provide a vehicular formed ceiling material that has improved strength and rigidity without increasing weight, as well as excellent formability and reduced costs.

To achieve the object, the present disclosure is characterized by using a paper material and a mat material formed from glass filaments or basalt filaments, and devising the way of layering the paper material and the mat material on a substrate layer, for forming a formed ceiling material.

Specifically, the present disclosure is directed to a vehicular formed ceiling material disposed on an in-cabin side of a roof panel of a vehicle and having a ceiling material body in the form of a panel. The following aspects are then applied.

According to a first aspect of the present disclosure, the ceiling material body includes a substrate layer formed from rigid urethane foam; a first fiber-reinforced layer formed through curing a first adhesive applied, and provided on an in-cabin side of the substrate layer; a second fiber-reinforced layer formed through curing a second adhesive applied, and provided on a roof panel side of the substrate layer; a surface layer bonded to an in-cabin side of the first fiber-reinforced layer using the first adhesive; and a back layer bonded to a roof panel side of the second fiber-reinforced layer using the second adhesive, wherein the first fiber-reinforced layer includes a first mat material obtained by accumulating randomly a number of chopped strands formed from glass filaments or basalt filaments into the shape of a mat to combine into one piece using a binder, wherein the second fiber-reinforced layer includes a paper material formed from glass filaments or basalt filaments, the paper material overlaying the substrate layer, and a second mat material obtained by accumulating randomly a number of chopped strands formed from glass filaments or basalt filaments into the shape of a mat to combine into one piece using a binder, the second mat material overlaying an opposite side of the paper material from the substrate layer.

According to a second aspect of the present disclosure in relation to the first aspect, the paper material has a basis weight of from 30 to 50 g/m2 and the second mat material has a basis weight of from 60 to 80 g/m2.

According to a third aspect of the present disclosure in relation to the first or second aspect, the paper material is produced by mixing polyester fibers into glass filaments or basalt filaments and using a vinyl acetate based treatment agent and after that, a number of chopped strands are generated from fiber bundles in which glass filaments or basalt filaments treated using a silane based treatment agent are bundled, and randomly dispersed over the paper material to be accumulated in the shape of a mat and then, the second mat material is produced by combining the chopped strands with the paper material using a polyester binder to overlay the paper material.

According to a fourth aspect of the present disclosure in relation to any one of the first to third aspects, the second adhesive is applied from a paper material side of the second fiber reinforced layer.

In the first aspect of the present disclosure, greater resistance is applied to the substrate layer due to the less stretchable paper material adjacent to the substrate layer as the substrate layer stretches during forming the formed ceiling material and thereby, stretched regions of the substrate layer are decentralized rather than being concentrated. This reduces greater stretches in a certain small region within the second fiber reinforced layer to thus improve formability and be able to reduce frequencies of breaks in the second fiber reinforced layer. The paper material is then provided in a part of the second fiber reinforced layer and thus, strength and rigidity of the formed ceiling material can be improved without greatly changing the basis weight as compared with a conventional structure where the second fiber reinforced layer is formed only from a second mat material, such as a glass mat. Particularly, the paper material is disposed adjacent to the substrate layer and thereby, the bonding area to the substrate layer via the adhesive is increased more than the case where the second mat material is disposed adjacent to the substrate layer, enabling increased strength and rigidity of and improved shape retention of the formed ceiling material. Further, there is no need to lower the density of the substrate layer and provide a film layer so as to improve formability and shape retention as described in JP2012-162138, thus preventing an increase in cost.

In the second aspect of the present disclosure, a percentage of the second mat material that deforms easier than the paper material is determined to be greater, thus enabling further improvement of formability while not affecting strength and rigidity of the formed ceiling material as much as possible.

In the third aspect of the present disclosure, when the fiber reinforced layer is produced, the second mat material and the paper material are combined while the second mat material is being produced. There are no operations for affixing the paper material and the second mat material by using an adhesive after producing each of the paper material and the second mat material as a single piece, and thus, the costs for manufacturing and for components can be reduced.

In the fourth aspect of the present disclosure, the paper material directly in contact with the substrate layer formed from rigid urethane foam that has a rough surface catches sufficiently the adhesive and thereby, the bonding area between the substrate layer and the second fiber reinforced layer can be greater and the substrate layer and the second fiber reinforced layer can be strongly connected.

DETAILED DESCRIPTION

Embodiments of the present disclosure are described in detail below with reference to the drawings. It is noted that the following description of preferred embodiments is merely an example in nature.

Figure 1:
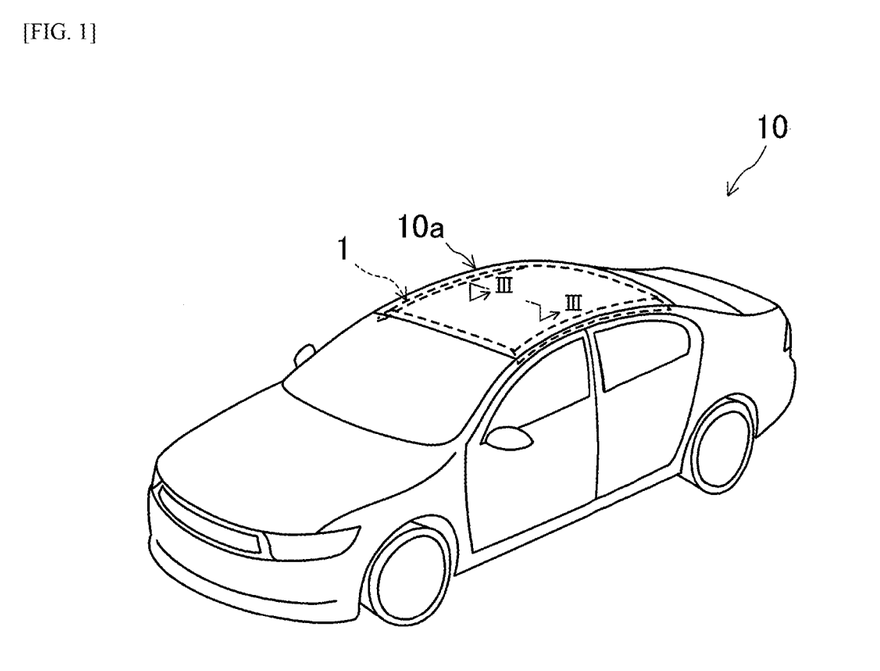
FIG. 1 is a perspective view of a vehicle including a vehicular formed ceiling material according to an embodiment of the present disclosure.
Figure 2:
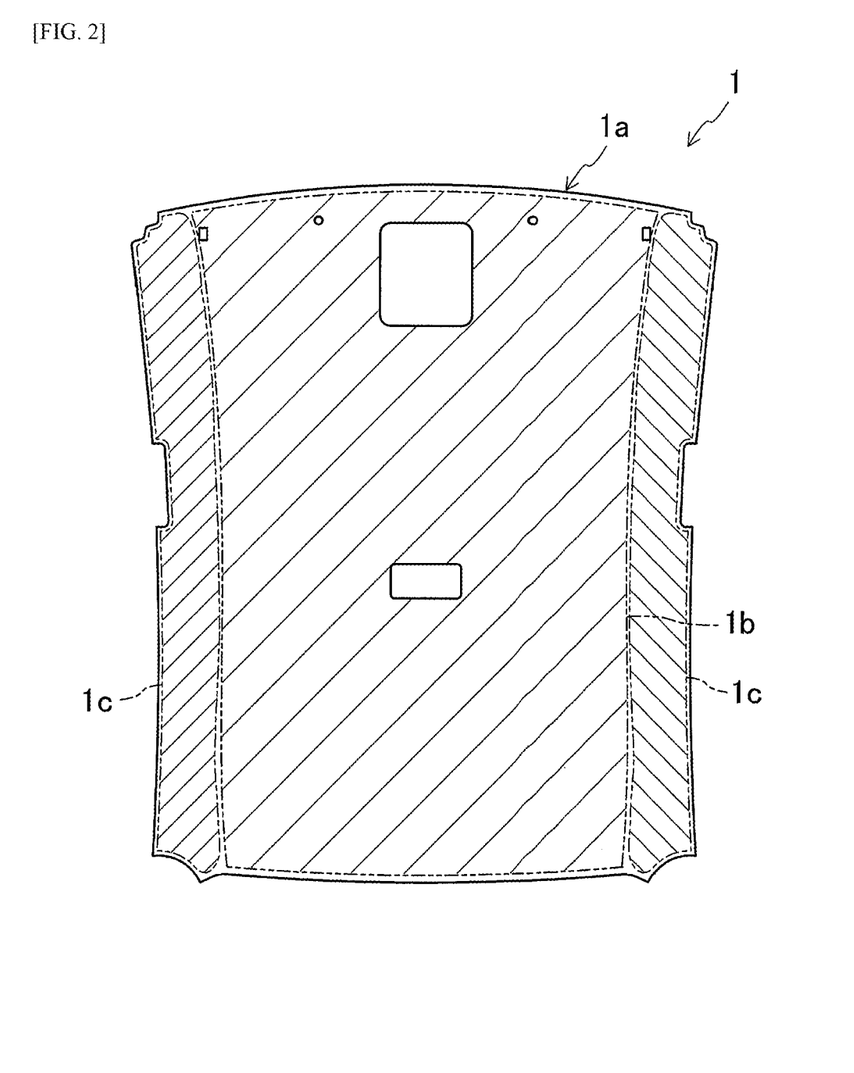
FIG. 2 is a plan view of a vehicular formed ceiling material according to an embodiment of the present disclosure.

FIG. 1 illustrates a vehicle 10 including a vehicular formed ceiling material 1 according to an embodiment of the present disclosure. The vehicular formed ceiling material 1 is disposed on an in-cabin side of a roof panel of the vehicle 10 and includes a ceiling material body 1a which is in the form of a panel, as illustrated in FIG. 2.

The ceiling material body 1a is obtained by press-forming a laminated sheet using a mold (not shown), and includes a general surface portion 1b being substantially flat and extending along a front-to-back direction of the vehicle and a pair of side surface portions 1c provided continuous with respective lateral edges of the general surface portion 1b and inclined to locate progressively downwardly toward outer sides in a vehicle width direction.

Figure 3:
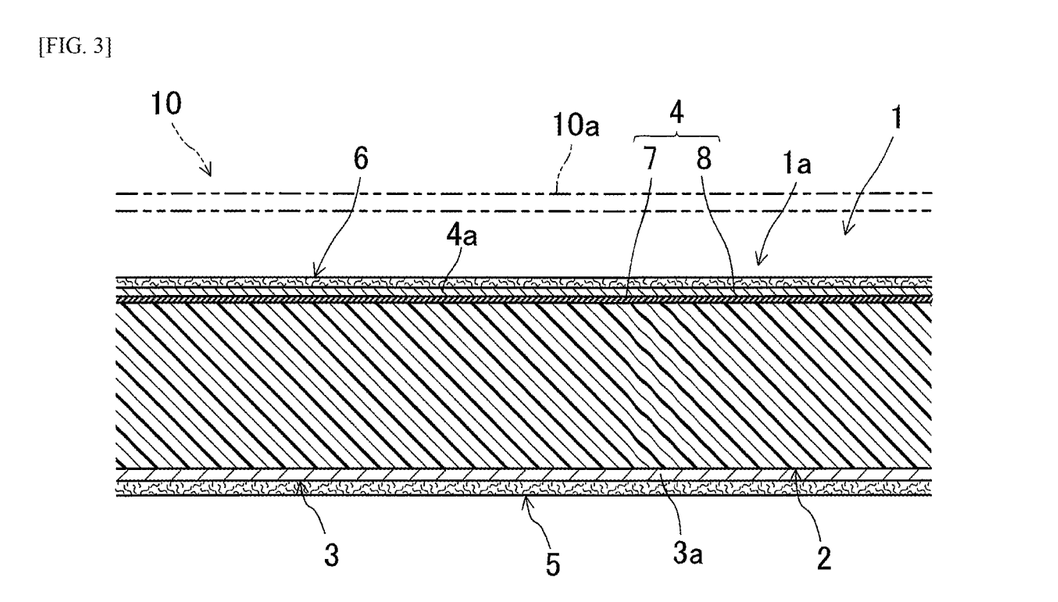
FIG. 3 is a cross-sectional view taken along a line in FIG. 1.

As illustrated in FIG. 3, the ceiling material body 1a includes a substrate layer 2 formed from rigid urethane foam; a first fiber-reinforced layer 3 provided on an in-cabin side of the substrate layer 2; a second fiber-reinforced layer 4 provided on a roof panel 10a side of the substrate layer 2; a surface layer 5 formed from non-woven fabric and provided on an in-cabin side of the first fiber-reinforced layer 3; and a back layer 6 formed from a film and non-woven fabric and provided on a roof panel 10a side of the second fiber-reinforced layer 4.

The rigid urethane foam of the substrate layer 2 has a density of 0.030 g/m3 and a thickness of 8 mm.

The first fiber-reinforced layer 3 includes a glass mat (first mat material) obtained by accumulating randomly into the shape of a mat a number of chopped strands formed from glass filaments to combine into one piece using a binder, and having a basis weight of 100 g/m2. The first fiber-reinforced layer 3 is formed by curing a first adhesive 3a formed of an isocyanate based resin and applied at 15 g/m2. The first fiber-reinforced layer 3 is bonded to the substrate layer 2 by curing the first adhesive 3a having penetrated into the substrate layer 2.

The second fiber-reinforced layer 4 includes glass paper 7 (paper material) formed from glass filaments and a glass mat 8 (second mat material) obtained by accumulating randomly a number of chopped strands formed from glass filaments into the shape of a mat to combine into one piece using a binder. The glass paper 7 overlays the substrate layer 2 and the glass mat 8 overlays an opposite side of the glass paper 7 from the substrate layer 2.

The second fiber reinforced layer 4 is obtained in the following manner: The glass paper 7 having a basis weight of 30 g/m2 is produced by mixing 4.5 weight % of polyester fibers into glass fibers having a fiber length of from 12 to 13 mm, and using a vinyl acetate based treatment agent. After that, a number of chopped strands are generated from fiber bundles in which glass filaments treated using a silane based treatment agent are bundled, and randomly dispersed over the glass paper 7 to be accumulated in the shape of a mat. The glass mat 8 having a basis weight of 70 g/m2 is produced by combining the chopped strands with the glass paper 7 using a polyester binder to overlay the glass paper 7.

Then, the second fiber reinforced layer 4 is formed by curing a second adhesive 4a formed of an isocyanate based resin and applied at 15 g/m2. The second fiber-reinforced layer 4 is bonded to the substrate layer 2 by curing the second adhesive 4a having penetrated into the substrate layer 2. The second adhesive 4a is then applied from a glass paper 7 side of the second fiber reinforced layer 4.

The surface layer 5 has a basis weight of the 200 g/m2 and is bonded to the first fiber reinforced layer 3 by the first adhesive 3a having penetrated into the surface layer 5 from the first fiber reinforced layer 3.

The back layer 6 then has a basis weight of the 70.5 g/m2 and is bonded to the second fiber reinforced layer 4 by the second adhesive 4a having penetrated into the back layer 6 from the second fiber reinforced layer 4.

For analyzing a relationship between deformation of the substrate layer 2 and the second fiber-reinforced layer 4 in the vehicular formed ceiling material 1 according to the embodiment of the present disclosure, a test piece T4 mimicking the formed ceiling material 1 was produced to conduct a bulge forming test similar to those for the test pieces T1 to T3 as described above.

Figure 4:
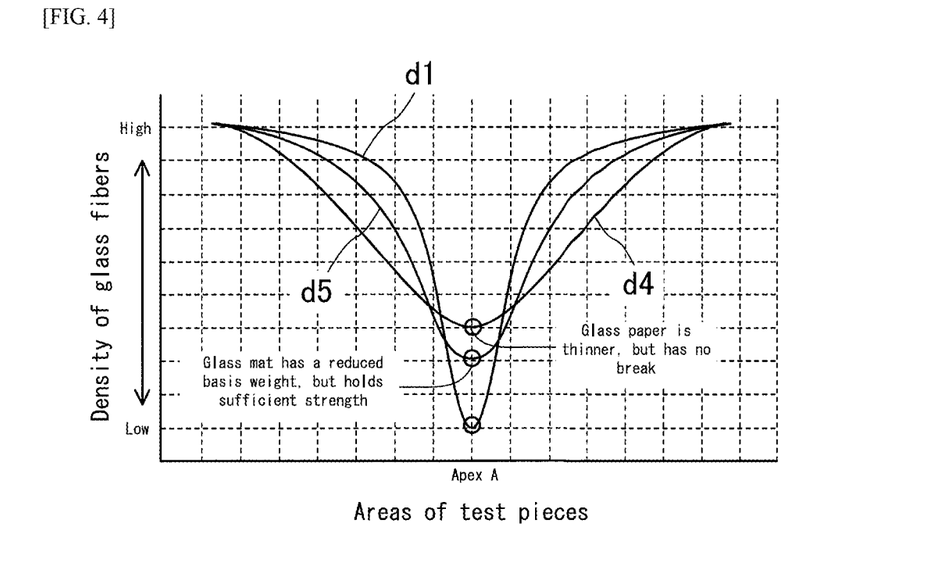
FIG. 4 is a graph showing results obtained by performing a bulge forming test on test pieces corresponding to a vehicular formed ceiling material according to an embodiment of the present disclosure, and illustrating a state of fiber densities in areas of fiber reinforced layers after forming.

FIG. 4 is a graph having a horizontal axis representing areas of the test piece T4 and a vertical axis representing a fiber density, plotted following observing a state of the second fiber reinforced layer 4 to measure the fiber density of the areas of the glass paper 7 and the glass mat 8 of the second fiber-reinforced layer 4, in a certain cross-section C passing through a portion of the bulge-formed test piece T4 corresponding with the apex A of the punch. Data d4 and d5 indicate a state of the glass paper 7 and that of the glass mat 8, respectively.

Then, as seen by data d5, in the glass mat 8 of the test piece T4, the fiber density does not decrease in the area corresponding with the apex A of the punch as compared with the case where the out-cabin side fiber reinforced layer is formed only of the glass mat as in the test piece T1.

In contrast, as seen by data d4, in the glass paper 7 of the test piece T4, while the fiber density does not decrease in the area corresponding with the apex A of the punch as compared with the case where the fiber reinforced layer is formed only of the glass mat as in the test piece T1, the fiber density decreases in the area corresponding with the apex A of the punch as compared with the glass mat 8 of the test piece T4. Thus, the second fiber reinforced layer 4 has improved formability during forming as compared with the case of only the glass mat.

A similar bulge-forming test was then conducted on the glass paper 7 of the test piece T4 having the basis weight changed to 30 g/m2 to 50 g/m2 and the glass mat 8 having the basis weight changed to 60 g/m2 to 80 g/m2 in order to assess whether the formability is improved even when the basis weights of the glass paper 7 and the glass mat 8 are changed to some extent. It was then confirmed that results similar to the case where the glass paper 7 of the test piece T4 has the basis weight of 30 g/m2 and the grass mat 8 has the basis weight of 70 g/m2 could be obtained.

Thus, the vehicular formed ceiling material 1 according to the embodiment of the present disclosure has excellent formability even when having the weight similar to that of the conventional common formed ceiling material, enabling reduced defects resulted from a break of the second fiber reinforced layer 4 during forming.

Next, evaluation results for strength and rigidity of the vehicular formed ceiling material 1 according to the embodiment of the present disclosure are explained.

Figure 5:
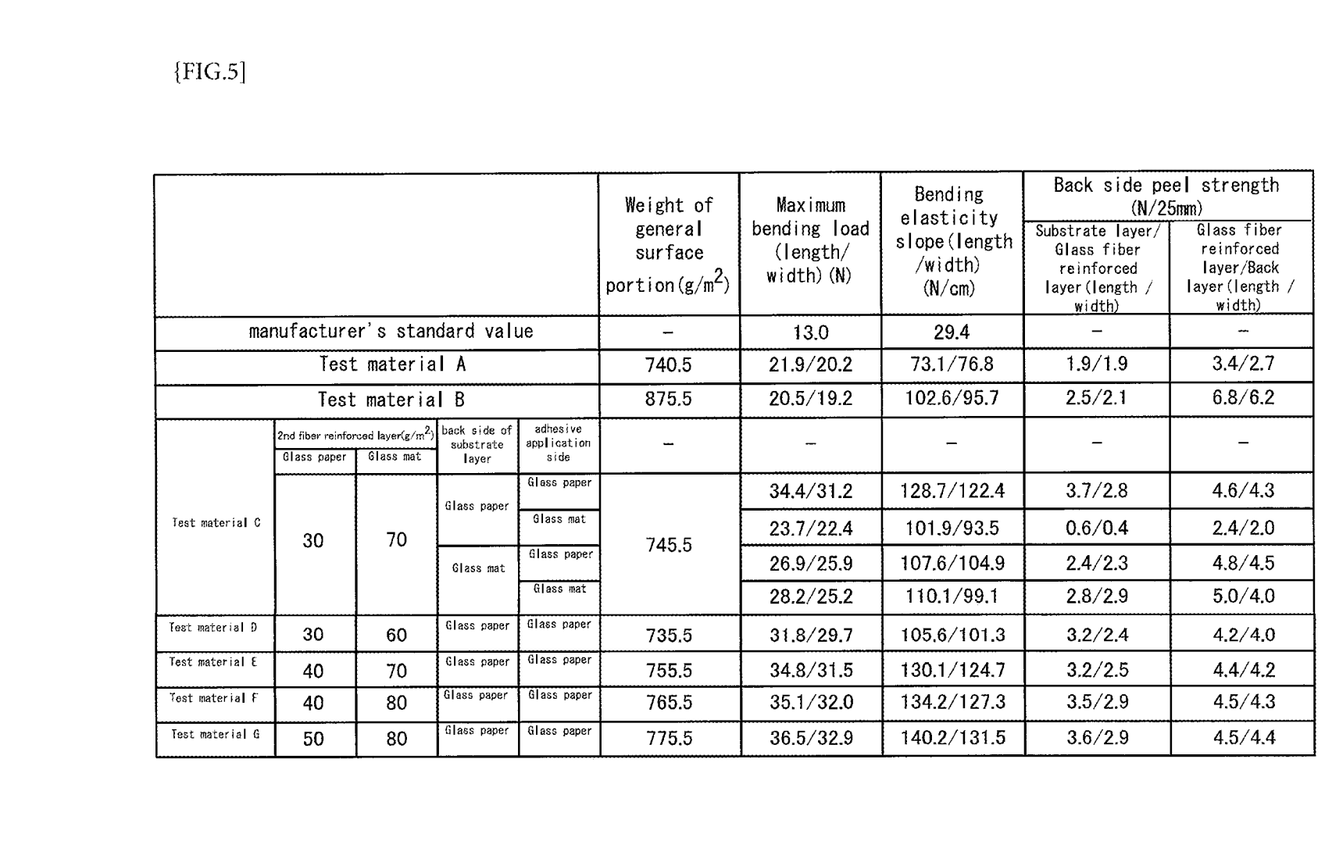
FIG. 5 is a table showing results of investigating and comparing strength and rigidity of a general surface portion of a vehicular formed ceiling material according to an embodiment of the present disclosure, with those of a conventional vehicular formed ceiling material.
Figure 6:
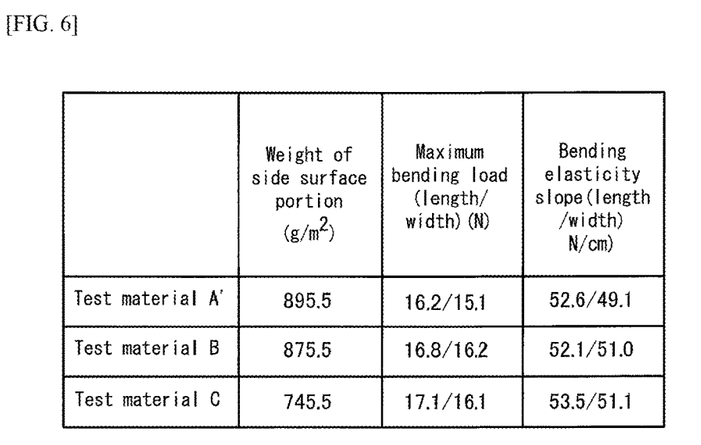
FIG. 6 is a table showing results of investigating and comparing strength and rigidity of a side surface portion of a vehicular formed ceiling material according to an embodiment of the present disclosure, with those of a conventional vehicular formed ceiling material.
Figure 7:
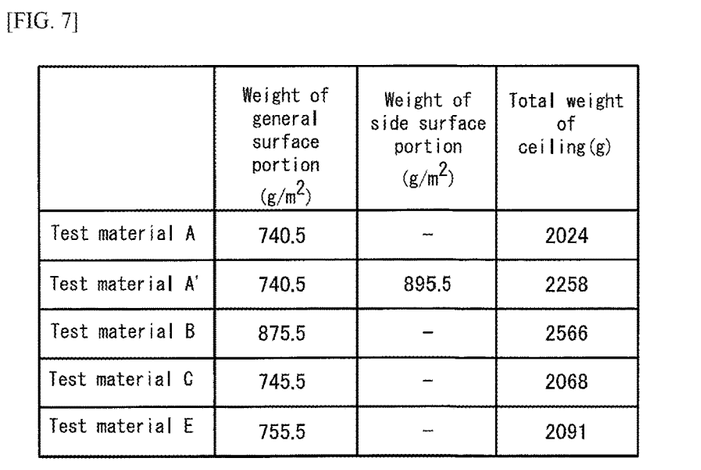
FIG. 7 is a table showing results of investigating and comparing a weight of a vehicular formed ceiling material according to an embodiment of the present disclosure, with that of a conventional vehicular formed ceiling material.

FIGS. 5 to 7 show a study of a maximum bending load, a bending elasticity slope, and back side peel strength each studied in two directions for prepared test materials to study whether strength and rigidity of the vehicular formed ceiling material 1 according to the embodiment of the present disclosure are improved as compared with those of conventional formed ceiling materials. The prepared test materials include a conventional formed ceiling material (test material A), a conventional formed ceiling material with a basis weight of an out-cabin side fiber reinforced layer and an amount of an out-cabin side adhesive being increased (test material B), and the vehicular formed ceiling material 1 according to the embodiment of the present disclosure (test materials C to G). In this respect, there is a conventional formed ceiling material having an added glass mat layer between a substrate layer and an out-cabin side fiber reinforced layer only on a side surface portion (see FIG. 2) for the purpose of improving workability during mounting to a vehicle. Thus, there is one for preventing the weight of the entire formed ceiling material from increasing by improving rigidity of required areas of the formed ceiling material rather than the entire area, in order to improve rigidity of the formed ceiling material. This was prepared as a test material A'.

The test material A includes a substrate layer (density of 0.030 g/m3, thickness of 8 mm), both fiber reinforced layers (Material is a glass mat. basis weight of 100 g/m2), an adhesive (application weight of 15 g/m2), a surface layer (basis weight of 200 g/m2), and a back layer (Materials are a film and non-woven fabric. basis weight of 70.5 g/m2).

The test material A' then includes an added glass mat layer of a basis weight of 135 g/m2 between the substrate layer and the out-cabin side fiber reinforced layer.

The test material B includes a substrate layer (density of 0.030 g/m3, thickness of 8 mm), a surface side fiber reinforced layer (Material is a glass mat. basis weight of 100 g/m2), a back side fiber reinforced layer (Material is a glass mat. basis weight of 230 g/m2), a surface side adhesive (application weight of 15 g/m2), a back side adhesive (application weight of 20 g/m2), a surface layer (basis weight of 200 g/m2), and a back layer (Materials are a film and non-woven fabric. basis weight of 70.5 g/m2).

The test material C includes a substrate layer 2 (density of 0.030 g/m3, thickness of 8 mm), a first fiber reinforced layer 3 (Material is a glass mat. basis weight of 100 g/m2), a second fiber reinforced layer 4 (Material is a laminate of the glass paper 7 and the glass mat 8. the glass paper 7 of a basis weight of 30 g/m2, the glass mat 8 of a basis weight of 70 g/m2), a first adhesive 3a (application weight of 15 g/m2), a second adhesive 4a (application weight of 20 g/m2), a surface layer 5 (basis weight of 200 g/m2), and a back layer 6 (Materials are a film and non-woven fabric. basis weight of 70.5 g/m2).

The test material D includes a substrate layer 2 (density of 0.030 g/m3, thickness of 8 mm), a first fiber reinforced layer 3 (Material is a glass mat. basis weight of 100 g/m2), a second fiber reinforced layer 4 (Material is a laminate of the glass paper 7 and the glass mat 8. the glass paper 7 of a basis weight of 30 g/m2, the glass mat 8 of a basis weight of 60 g/m2), a first adhesive 3a (application weight of 15 g/m2), a second adhesive 4a (application weight of 20 g/m2), a surface layer 5 (basis weight of 200 g/m2), and a back layer 6 (Materials are a film and non-woven fabric. basis weight of 70.5 g/m2).

The test material E includes a substrate layer 2 (density of 0.030 g/m3, thickness of 8 mm), a first fiber reinforced layer 3 (Material is a glass mat. basis weight of 100 g/m2), a second fiber reinforced layer 4 (Material is a laminate of the glass paper 7 and the glass mat 8. the glass paper 7 of a basis weight of 40 g/m2, the glass mat 8 of a basis weight of 70 g/m2), a first adhesive 3a (application weight of 15 g/m2), a second adhesive 4a (application weight of 20 g/m2), a surface layer 5 (basis weight of 200 g/m2), and a back layer 6 (Materials are a film and non-woven fabric. basis weight of 70.5 g/m2).

The test material F includes a substrate layer 2 (density of 0.030 g/m3, thickness of 8 mm), a first fiber reinforced layer 3 (Material is a glass mat. basis weight of 100 g/m2), a second fiber reinforced layer 4 (Material is a laminate of the glass paper 7 and the glass mat 8. the glass paper 7 of a basis weight of 40 g/m2, the glass mat 8 of a basis weight of 80 g/m2), a first adhesive 3a (application weight of 15 g/m2), a second adhesive 4a (application weight of 20 g/m2), a surface layer 5 (basis weight of 200 g/m2), and a back layer 6 (Materials are a film and non-woven fabric. basis weight of 70.5 g/m2).

The test material G includes a substrate layer 2 (density of 0.030 g/m3, thickness of 8 mm), a first fiber reinforced layer 3 (Material is a glass mat. basis weight of 100 g/m2), a second fiber reinforced layer 4 (Material is a laminate of the glass paper 7 and the glass mat 8. the glass paper 7 of a basis weight of 50 g/m2, the glass mat 8 of a basis weight of 80 g/m2), a first adhesive 3a (application weight of 15 g/m2), a second adhesive 4a (application weight of 20 g/m2), a surface layer 5 (basis weight of 200 g/m2), and a back layer 6 (Materials are a film and non-woven fabric. basis weight of 70.5 g/m2).

For each test material A, A', and B to G, twelve pieces were measured to calculate an average. Back side peel strength was measured between the substrate layer and the out-cabin side fiber reinforced layer and between the out-cabin side fiber reinforced layer and the back layer. Further, the test material C having the glass paper 7 and the glass mat 8 of the second fiber reinforced layer 4 oppositely located was also measured. In addition, the test materials C having the second adhesives 4a being applied from a glass paper 7 side of the second fiber reinforced layer 4 and from a glass mat 8 side of the second fiber reinforced layer 4 were each measured. Data shown in FIG. 6 were measured using test materials with the side surface portion 1b having a thickness of 5.5 mm which is same as that of the conventional formed ceiling material.

The test results show that the test materials C to G having the glass paper 7 of the second fiber reinforced layer 4 disposed on a substrate layer 2 side and the second adhesive 4a applied from the glass paper 7 side demonstrate an about 1.5 to 2 fold increase of strength and rigidity while having the weight equivalent to that of the test material A which is a conventional formed ceiling material. Further, the test materials C to G are light-weight and have improved strength and rigidity in the entire area of the ceiling material body 1a, even as compared with the test material A' which has the added glass mat layer between the substrate layer and the out-cabin side fiber reinforced layer only on the side surface portion and with the test material B which has the increased out-cabin side fiber reinforced layer and out-cabin side adhesive.

Then, even in the test material C, strength and rigidity were not improved as expected, when the glass mat 8 of the second fiber reinforced layer 4 is disposed on the substrate layer 2 side. This is because the glass mat 8 is coarser than the glass paper 7 and has a bonding area to the substrate layer 2 (area in contact with the substrate layer 2) smaller than that of the glass paper 7. Thus, the glass paper 7 is disposed adjacent to the substrate layer 2 and thereby, the bonding area to the substrate layer 2 via the second adhesive 4a is increased more than the case where the glass mat 8 is disposed adjacent to the substrate layer 2, enabling increased strength and rigidity of and improved shape retention of the formed ceiling material 1.

The test results of the test material C show that sufficient strength and rigidity are not able to be obtained unless the second adhesive 4a is applied from the glass paper 7 side of the second fiber reinforced layer 4, even when the glass paper 7 of the second fiber reinforced layer 4 is disposed on the substrate layer 2 side. This is because the substrate layer 2 formed from rigid urethane foam has a rough surface and thereby, the bonding area to the substrate layer 2 is smaller to reduce adhesive strength unless the glass paper 7 directly in contact with the substrate layer 2 sufficiently catches the second adhesive 4a.

Figure 8:
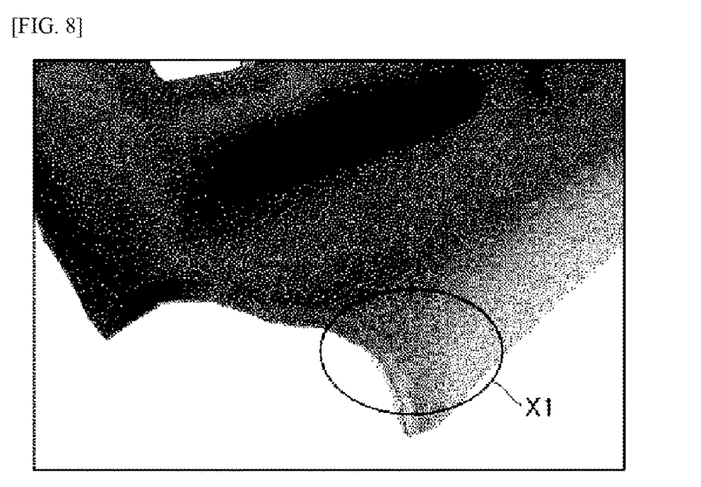
FIG. 8 is a photograph taken from an in-cabin side for a vehicle front portion of a vehicular formed ceiling material according to an embodiment of the present disclosure.

FIG. 8 is a photograph taken from an in-cabin side for a region X1 where the shape is significantly modified during the formation in the vehicular formed ceiling material 1 according to the embodiment of the present disclosure, and shows no unevenness in the region X1. No wrinkle then occurs throughout the entire area of the surface layer 5, providing the formed ceiling material 1 excellent in commercial use.

Figure 9:
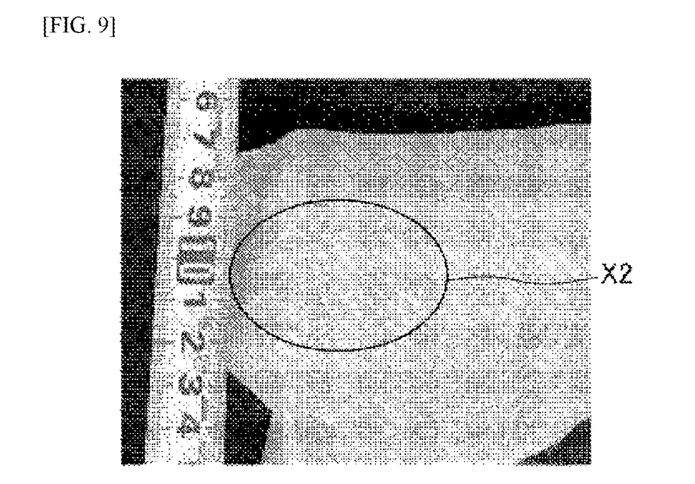
FIG. 9 is a photograph taken from the in-cabin side after peeling an out-cabin portion from a substrate layer in a vehicle front portion of a vehicular formed ceiling material according to an embodiment of the present disclosure.

FIG. 9 is also a photograph taken from the in-cabin side after peeling an out-cabin portion from the substrate layer 2 of the vehicular formed ceiling material 1 having formed, and shows a region X2 located corresponding to the region X1 of FIG. 8. The glass paper 7 in the region X2 does not break and the glass mat 8 in the region X2 has a reduced basis weight to some extent, which, however, are still sufficient to hold strength and rigidity.

Thus, when the second fiber reinforced layer 4 includes the glass paper 7 and the glass mat 8 layered in the order from the substrate layer 2 side as in the vehicular formed ceiling material 1 according to the embodiment of the present disclosure, greater resistance is applied to the substrate layer 2 due to the less stretchable glass paper 7 adjacent to the substrate layer 2 as the substrate layer 2 stretches during forming the formed ceiling material 1, and stretched regions of the substrate layer 2 are decentralized rather than being concentrated. This reduces greater stretches in a certain small region within the second fiber reinforced layer 4 to thus improve formability and be able to reduce frequencies of breaks in the second fiber reinforced layer 4.

The glass paper 7 is provided in a part of the second fiber reinforced layer 4 and thus, strength and rigidity of the formed ceiling material 1 can be improved without greatly changing the basis weight as compared with the conventional structure where the second fiber reinforced layer 4 is formed only from the glass mat 8.

Further, according to the embodiment of the present disclosure, there is no need to lower density of the substrate layer 2 or provide a film layer to improve formability and shape retention as described in JP2012-162138, thus preventing an increase in cost.

In the second fiber reinforced layer 4, the glass paper 7 has a basis weight of 30 g/m2 and the glass mat 8 has a basis weight of 70 g/m2. A percentage of the glass mat 8 that deforms easier than the glass paper 7 is thus determined to be greater, thereby enabling further improvement of formability while not affecting strength and rigidity of the formed ceiling material 1 as much as possible.

When the second fiber reinforced layer 4 is produced, the glass mat 8 and the glass paper 7 are combined while the glass mat 8 is being produced. There are no operations for affixing the glass paper 7 and the glass mat 8 by using an adhesive after producing each of the glass paper 7 and the glass mat 8 as a single piece, and thus, the costs for manufacturing and for components can be reduced.

The second adhesive 4a is then applied from the glass paper 7 side of the second fiber reinforced layer 4 and thus, the glass paper 7 directly in contact with the substrate layer 2 formed from rigid urethane foam that has a rough surface catches sufficiently the second adhesive 4a. Thus, the bonding area between the substrate layer 2 and the second fiber reinforced layer 4 can be greater and the substrate layer 2 and the second fiber reinforced layer 4 can be strongly connected.

In the embodiment of the present disclosure, the first fiber reinforced layer 3 is formed from the glass mat and the second fiber reinforced layer 4 is formed from the glass paper 7 formed of glass filaments and glass mat 8; however, even when the paper and mat materials are produced using basalt filaments obtained from basalt, the formed ceiling material 1 having same performance as those produced using the glass filaments can be obtained. On one hand, once burnt, the glass filaments are partially crystallized and become industrial waste. On the other hand, when burnt the basalt filaments become ashes to be able to return to the nature. When the first mat material of the first fiber reinforced layer 3 and the paper material and the second mat material of the second fiber reinforced layer 4 are produced from the basalt filaments, the formed ceiling material 1 can be an environmental-friendly product.

In the embodiment of the present disclosure, the glass mat 8 overlays the glass paper 7 to combine in a process of producing the glass mat 8; however, the glass paper 7 and the glass mat 8 may be separately produced and subsequently affixed, for example, using EVA (ethylene-vinyl acetate copolymer resin) to thereby produce the second fiber reinforced layer 4.

In the embodiment of the present disclosure, vinyl acetate based and silane based treatment agents are used as a treatment agent for producing the glass paper 7 and the glass mat 8; however, the glass paper 7 and the glass mat 8 may be produced by using other treatment agents when affinity of the glass paper 7 and the glass mat 8 for the second adhesive 4a based on isocyanate may be established.

The present disclosure is suitable for a formed ceiling material for a vehicle disposed on an in-cabin side of a roof panel of a vehicle.

The invention claimed is:

1. A vehicular formed ceiling material disposed on an in-cabin side of a roof panel of a vehicle and having a ceiling material body in the form of a panel, the ceiling material body comprising:
    a substrate layer formed from rigid urethane foam;
    a first fiber-reinforced layer formed through curing a first adhesive applied, and provided on an in-cabin side of the substrate layer;
    a second fiber-reinforced layer formed through curing a second adhesive applied, and provided on a roof panel side of the substrate layer;
    a surface layer bonded to an in-cabin side of the first fiber-reinforced layer using the first adhesive; and
    a back layer bonded to a roof panel side of the second fiber-reinforced layer using the second adhesive,
    wherein the first fiber-reinforced layer includes a first mat material obtained by accumulating randomly a number of chopped strands formed from glass filaments or basalt filaments into the shape of a mat to combine into one piece using a binder,
    wherein the second fiber-reinforced layer includes a paper material formed from glass filaments or basalt filaments, the paper material overlaying the substrate layer, and a second mat material obtained by accumulating randomly a number of chopped strands formed from glass filaments or basalt filaments into the shape of a mat to combine into one piece using a binder, the second mat material overlaying an opposite side of the paper material from the substrate layer.

2. The vehicular formed ceiling material according to claim 1, wherein the paper material has a basis weight of from 30 to 50 g/m$^2$, and the second mat material has a basis weight of from 60 to 80 g/m$^2$.

3. The vehicular formed ceiling material according to claim 1, wherein
    the paper material includes glass paper formed from glass filaments, and
    the second mat material includes a glass mat that includes the chopped strands formed from glass filaments and randomly accumulated into the shape of a mat.

4. The vehicular formed ceiling material according to claim 3, wherein the glass mat includes the chopped strands generated from fiber bundles in which glass filaments are bundled, and randomly accumulated in the shape of a mat.

5. The vehicular formed ceiling material according to claim 3, wherein the glass filaments used in the glass paper have a fiber length from 12 to 13 mm.

6. The vehicular formed ceiling material according to claim 3, wherein
    the glass paper has a basis weight from 30 to 50 g/m$^2$, and
    the glass mat has a basis weight from 60 to 80 g/m$^2$.

7. The vehicular formed ceiling material according to claim 6, wherein
    the glass paper has a basis weight of 30 g/m$^2$, and
    the glass mat has a basis weight of 70 g/m$^2$.

8. A method of producing the vehicular formed ceiling material according to claim 1, comprising:
    producing the paper material by mixing polyester fibers into glass filaments or basalt filaments and using a vinyl acetate based treatment agent;
    generating the number of chopped strands from fiber bundles in which glass filaments or basalt filaments treated using a silane based treatment agent are bundled, and dispersing the number of chopped strands randomly over the paper material to be accumulated in the shape of a mat; and
    producing the second mat material by combining the chopped strands with the paper material using a polyester binder to overlay the paper material.

9. The method of producing the vehicular formed ceiling material according to claim 8, wherein the second adhesive is applied from a paper material side of the second fiber reinforced layer.

* * * * *